US009727849B2

(12) United States Patent
Sethi et al.

(10) Patent No.: US 9,727,849 B2
(45) Date of Patent: \*Aug. 8, 2017

(54) REPLENISHING A USER ACCOUNT WITH MORE ACCESS RESOURCES NEEDED FOR ACCESSING NETWORK SERVICES

(71) Applicant: CISCO TECHNOLOGY, INC., San Jose, CA (US)

(72) Inventors: Aseem Sethi, Bangalore (IN); Pranav Kumar Tiwari, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 14/058,850

(22) Filed: Oct. 21, 2013

(65) Prior Publication Data

US 2014/0052622 A1    Feb. 20, 2014

Related U.S. Application Data

(63) Continuation of application No. 13/337,032, filed on Dec. 23, 2011, now Pat. No. 8,606,944, which is a
(Continued)

(51) Int. Cl.
*G06F 15/16* (2006.01)
*G06Q 20/14* (2012.01)
(Continued)

(52) U.S. Cl.
CPC ..... *G06Q 20/145* (2013.01); *G06F 17/30067* (2013.01); *G06F 21/6272* (2013.01);
(Continued)

(58) Field of Classification Search
CPC ..... G06Q 20/145; H04L 69/168; H04L 12/14; H04L 43/0817; H04L 12/1453; H04L 69/16; G06F 17/30067; G06F 21/6272
See application file for complete search history.

(56) References Cited

U.S. PATENT DOCUMENTS 6,119,160 A     9/2000 Zhang et al.
6,311,275 B1   10/2001 Jin et al.
(Continued)

FOREIGN PATENT DOCUMENTS

WO     WO9923794     5/1999

OTHER PUBLICATIONS

W. Simpson, entitled, "Request for Comments: 1570—PPP LCP Extensions", www.ietf.org, Jan. 1994, 19 pages.
(Continued)

*Primary Examiner* — Tauqir Hussain
*Assistant Examiner* — Michael A Keller
(74) *Attorney, Agent, or Firm* — Patent Capital Group

(57) ABSTRACT

A network access server (NAS) determines the status of availability (e.g., how much more quota is unused) of an access resource, and sends a notification embedded in a point-to-point protocol (PPP) packet. The format of the packet is chosen such that definition/use of higher layers (e.g., HTTP) is not required to communicate the status to a client system. As a result, the user may be notified even if software such as web browser is not being executed on the client system.

20 Claims, 5 Drawing Sheets

Related U.S. Application Data continuation of application No. 12/968,634, filed on Dec. 15, 2010, now Pat. No. 8,090,855, which is a continuation of application No. 10/392,914, filed on Mar. 21, 2003, now Pat. No. 7,873,736.

(51) Int. Cl.

| | | |
|---|---|---|
| *G06F 17/30* | (2006.01) | |
| *G06F 21/62* | (2013.01) | |
| *H04L 12/14* | (2006.01) | |
| *H04L 12/26* | (2006.01) | |
| *H04L 29/06* | (2006.01) | |

(52) U.S. Cl.
CPC .......... *H04L 12/14* (2013.01); *H04L 12/1453* (2013.01); *H04L 43/0817* (2013.01); *H04L 69/168* (2013.01); *H04L 69/16* (2013.01)

(56) References Cited

U.S. PATENT DOCUMENTS

| | | |
|---|---|---|
| 6,430,619 B1 | 8/2002 | Sitaraman et al. |
| 6,668,283 B1 | 12/2003 | Sitaraman et al. |
| 6,707,894 B1 | 3/2004 | Halford |
| 6,728,895 B1 | 4/2004 | Nelson |
| 7,239,862 B1 | 7/2007 | Clare et al. |
| 7,873,736 B1 | 1/2011 | Sethi et al. |
| 8,090,855 B2 | 1/2012 | Sethi et al. |
| 2001/0001147 A1* | 5/2001 | Hutchison .............. G06Q 20/04 705/51 |
| 2001/0040949 A1 | 11/2001 | Blonder et al. |
| 2002/0029189 A1 | 3/2002 | Titus |
| 2002/0046277 A1 | 4/2002 | Barna et al. |
| 2002/0115424 A1* | 8/2002 | Bagoren ............... H04M 15/90 455/408 |
| 2002/0133457 A1 | 9/2002 | Gerlach et al. |
| 2003/0014367 A1* | 1/2003 | Tubinis .................. G06Q 20/12 705/64 |
| 2003/0055735 A1 | 3/2003 | Cameron et al. |
| 2003/0187731 A1* | 10/2003 | Takakura ........... G06Q 30/0223 705/14.24 |
| 2004/0018829 A1 | 1/2004 | Raman et al. |
| 2012/0096161 A1 | 4/2012 | Sethi et al. |
| 2012/0096170 A1 | 4/2012 | Sethi et al. |

OTHER PUBLICATIONS

W. Simpson, "Request for Comments: 1661—Point to Point Protocol", Available from www.ietf.org, Jul. 1994, 54 pages.

"Real-time services on the Internet", May 1999, 1999EURESCOM Participants in Project P913-GI, 70 pages.

"Absolute", Available from www.sergon.com.tr/ser/Absmain.doc, Date downloaded: Feb. 13, 2003, 40 pages.

* cited by examiner

REPLENISHING A USER ACCOUNT WITH MORE ACCESS RESOURCES NEEDED FOR ACCESSING NETWORK SERVICES

RELATED APPLICATION

This Application is a continuation (and claims the benefit of priority under 35 U.S.C. §120) of U.S. patent application Ser. No. 13/337,032, filed on Dec. 23, 2011, entitled "REPLENISHING A USER ACCOUNT WITH MORE ACCESS RESOURCES NEEDED FOR ACCESSING NETWORK SERVICES," Inventor(s) Aseem Sethi, et al., which is a continuation of and in turn claims priority to U.S. patent application Ser. No. 12/968,634, filed on Dec. 15, 2010, entitled "REPLENISHING A USER ACCOUNT WITH MORE ACCESS RESOURCES NEEDED FOR ACCESSING NETWORK SERVICES," Inventor(s) Aseem Sethi, et al., which is a continuation of and in turn claims priority to U.S. patent application Ser. No. 10/392,914, filed Mar. 21, 2003, now issued as U.S. Pat. No. 7,873,736, entitled "REPLENISHING A USER ACCOUNT WITH MORE ACCESS RESOURCES NEEDED FOR ACCESSING NETWORK SERVICES," Inventor(s) Aseem Sethi, et al. The disclosure of the prior applications are considered part of (and are incorporated by reference in) the disclosure of this application.

BACKGROUND OF THE INVENTION

1. Field of the Invention

The present invention relates to network access servers (NAS) used in enabling access to various network services, and more specifically to a method and apparatus for replenishing a user account with more access resources needed for accessing such services.

2. Related Art

Access providers (e.g., an internet service provider (ISP)) may control the extent to which users can access various services (e.g., movies, songs, on-line games, etc., hereafter "network services") provided from various networks. Such control may be used, for example, to bill (force payment) users for the network services accessed.

In a typical scenario, an access provider uses a network access server (NAS) which forwards or blocks packets related to a user (or a group of users) based on various access resources a user is entitled to use. For example, an access resource may specify that the user is permitted to access a specific movie for 2 hours only. Accordingly, the NAS may forward the related packets only for 2 hours.

At least to control access to network services, an access provider may maintain a user account associated with a single or a group of users. The user account may be used to specify the access resources (time permitted to access a service or network, number of total bytes permitted to transfer, etc.) a user is permitted to use while accessing various network services. Systems such as billing servers, which enable a user to pre-purchase (or specify other payment options) desired access resources, may be used to specify the access resources users are permitted to use.

A user account may need to be replenished with more access resources when a user is accessing network services. For example, a user account may specify that the user is permitted to access a movie for only 2 hours and the user may be on verge of exceeding such permitted time (while continuing to watch the movie). It may be desirable to enable the user to continue to access the network service, possibly by enabling the user to replenish the user account by purchasing more access resources.

In a prior approach, when such replenishment is required for a user, a NAS may intercept a HTTP request (for a web page from the same client system from which a network service is being accessed) and redirect the user to a web page which indicates the access resources which require replenishment for continuation of access to the network service. One problem with such an approach is that a HTTP request may not be timely received from a client system, or even worse the user may not be using a corresponding software (typically web browser). Accordingly, such a solution may not be suitable in several environments.

SUMMARY OF THE INVENTION

According to an aspect of the present invention, a network access server (NAS) determines the status of availability of an access resource required to access a network service, and sends a notification of the status to a client system. A user at the client system may then take any appropriate action (e.g., replenish the account with more of the depleted resource).

According to another aspect of the present invention, the notification sent to a client system is embedded in a point-to-point protocol (PPP) packet and a format is used such that sending the notification does not require the client system to be executing software (e.g., web browser) which supports higher level protocols.

A client system may be designed to receive the notification and provide a suitable interface to a user to display the status. The user may then take an appropriate action as needed to replenish a corresponding user account with more of the access resource(s).

Accordingly, a user may be informed of the status of availability of an access resource (e.g., time remaining in a permitted quota) by merely being connected to a NAS using PPP.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE EMBODIMENTS

1. Overview

A network access server (NAS) determines the status of availability of an access resource required to access a network service, and sends a notification of the status to a client system. By performing the tasks of determination and sending from the NAS, the notification may be provided reliably to client systems.

In an embodiment, the notification is sent in the form of a PPP packet having a format such that use/definition of higher level layers (such as TCP or HTTP) on top of PPP is not necessary to send the notification. A client system may receive the notification and enable a user to take appropriate action (e.g., purchase more access resources). In an embodiment, the notification is embedded in a portion of a Link Control Protocol (LCP) packet.

As no specific higher level protocol (e.g., HTTP) is used and as a client system may already be executing software supporting PPP, notification of requirement to replenish access resources may be easily delivered to a user using the client system. In other words, the notification may not depend on specific higher level protocols executing on top of PPP, and can be delivered to a user any time the corresponding client system is connected to a NAS.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
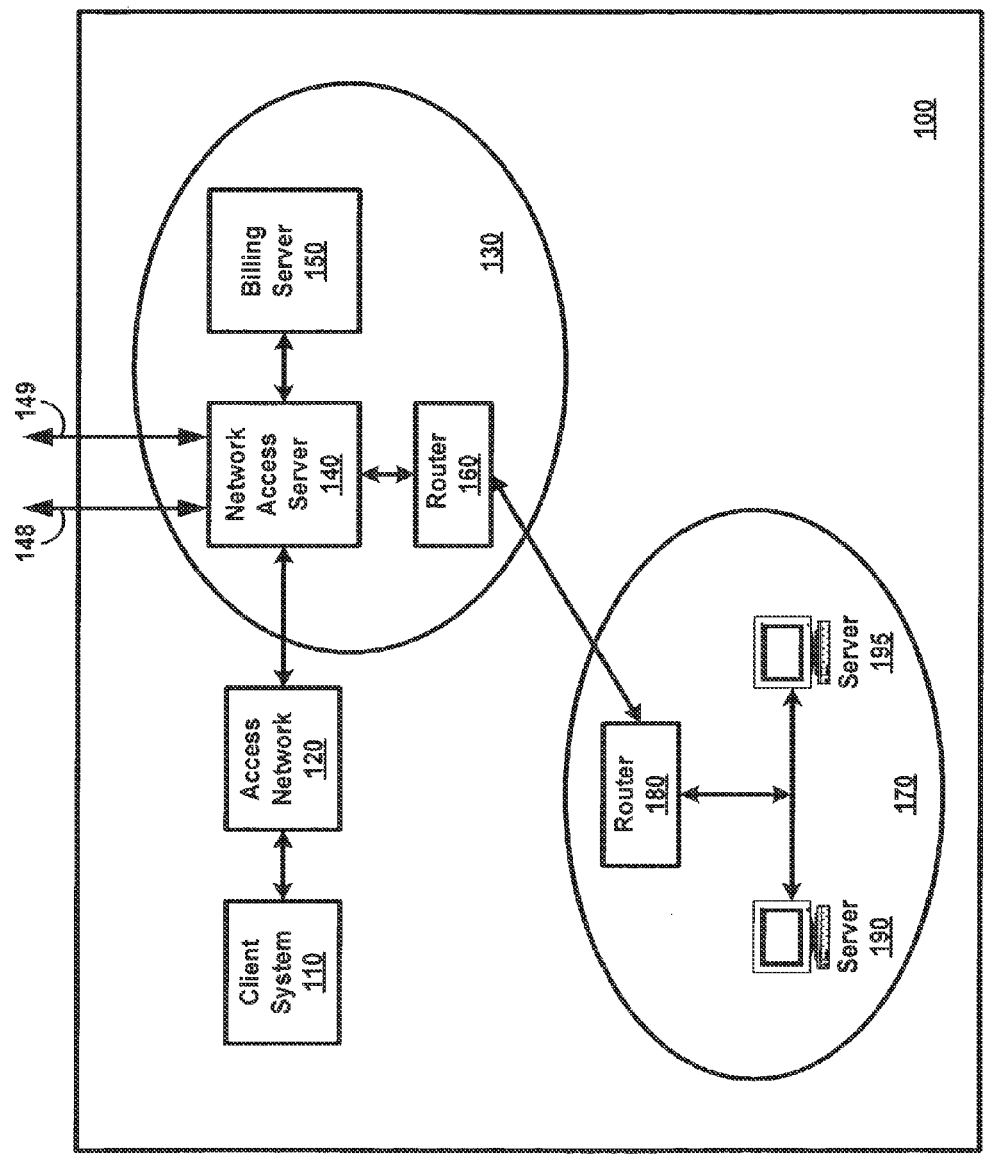
FIG. 1 is a block diagram of a communication system illustrating an example environment in which the present invention can be implemented.

FIG. 1 is a block diagram of communication system 100 illustrating an example environment in which the present invention can be implemented. Communication system 100 is shown containing client system 110, access network 120, provider network 130, and intranet 170. Provider network 130 in turn is shown containing network access server (NAS) 140, billing server 150 and router 160. Intranet 130 is shown containing router 180, and servers 190 and 195.

The manner in which each component operates to enable a user to access various network services, and the manner in which access resources can be replenished according to various aspects of the present invention is described below in further detail. It should be understood that FIG. 1 is shown only with a few systems for illustration. However, typical environments contain several more systems.

Servers 190 and 195 provide various network services (e.g., movies, videos, content, games), which can be accessed from the Internet, and may be implemented in a known way. Router 180 interfaces with router 160 to provide the necessary connectivity for servers 190 and 195. The communication between the servers and the routers may be implemented using protocols such as Internet Protocol (IP) in a known way.

Billing server 150 may store data representing various access resources each user is permitted to use. The corresponding information may be provided to NAS 140 to enable appropriate control of access to various network services. Billing server 150 may further enable a user to replenish access resources with suitable user interfaces. For example, a web based interface may be provided to enable a user to enter payment information and access resource/service of interest, and the corresponding access resource(s) may be replenished. Alternatively, an agent may manually cause access resources to be replenished after receiving payment information from a user.

Access network 120 provides the physical, electrical and protocol interfaces to enable connectivity between client system 110 and NAS 140. Access mechanisms such as ISDN, dial-up connection, DSL, and cable networks may be used to provide such connectivity. Access network 120 may be implemented in a known way.

Client system 110 enables a user to access various network services provided on servers 190/195. In general, client system 110 can be implemented in any digital processing system (e.g., personal computers, note books, palm-held computers, mobile phones, etc.). The manner in which client system 110 can be implemented according to various aspects of the present invention is described below in further detail.

Network access server (NAS) 140 controls access of various network services (provided on servers 190/195) to users using client system 110. Access to at least some of the network services may be enabled based on availability of an access resource for the specific user (or client system 110). Information on such access resources may be received from billing server 150. NAS 140 may update billing server 150 with the resources used (depleted) such that the remaining available amount (for each access resource) a user is permitted to use may be maintained in billing server 150. NAS 140 may provide connectivity to other resources on the world-wide web as represented by paths 148 and 149.

However, the access resource may be used (consumed/depleted) when a user accesses various network services, and it may be desirable to notify the user of the need to replenish the corresponding access resource(s). The manner in which such a notification can be sent (and replenishment accomplished) is described below in further detail with reference to various examples.

3. Operation of Network Access Server

Figure 2:
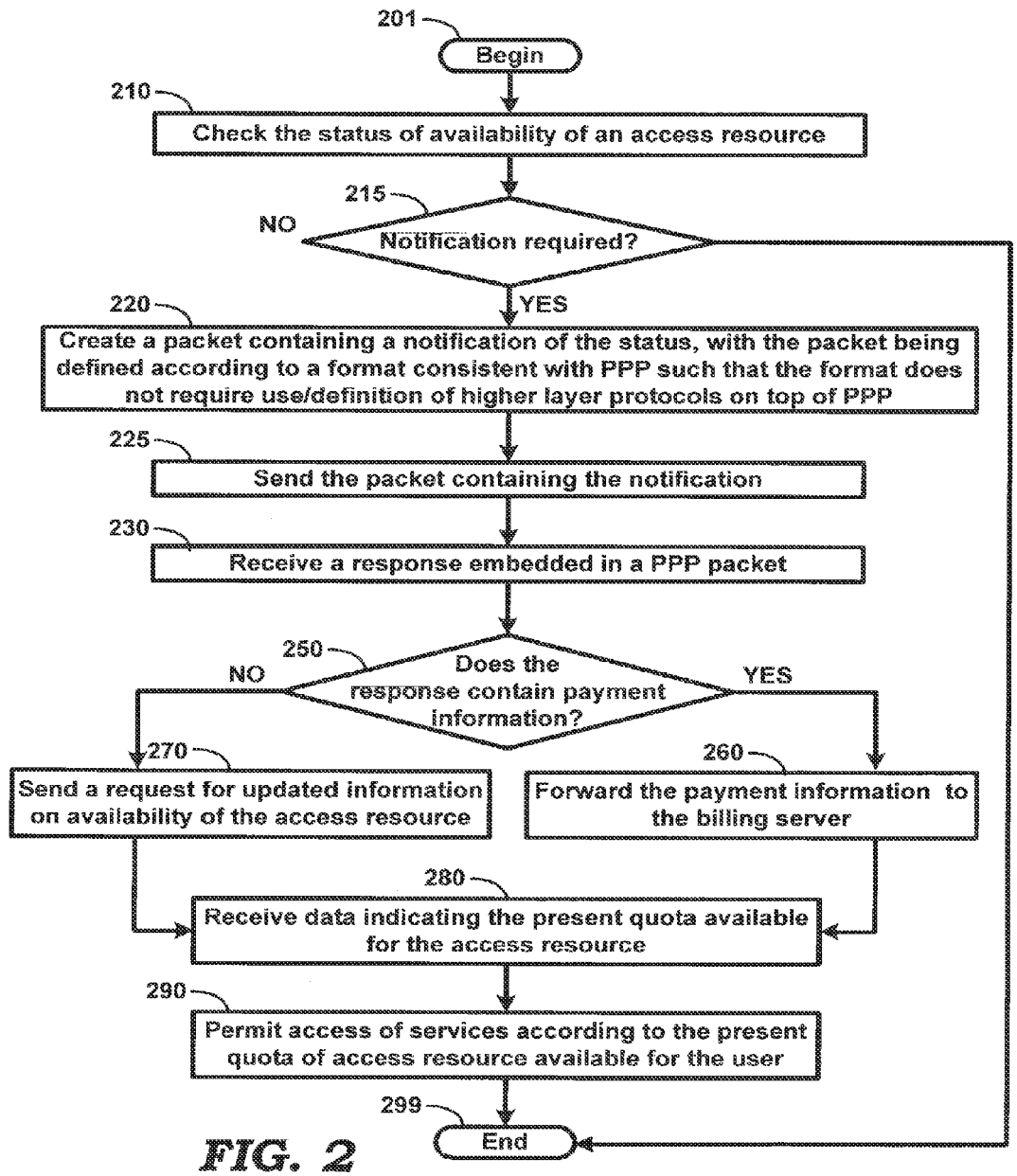
FIG. 2 is a flowchart illustrating the operation of a network access server in an embodiment of the present invention.

FIG. 2 is a flow chart illustrating a method using which a network access server may enable network services to be provided to users using client systems. The description is provided with reference to FIG. 1 for illustration. However, the method can be implemented in several other environments as well, as will be apparent to one skilled in the relevant arts by reading the disclosure provided herein. The implementations in such alternative embodiments are contemplated to be within the scope and spirit of various aspects of the present invention. The method begins in step 201, in which control passes to step 210.

In step 210, network access server (NAS) 140 checks the status of availability of an access resource. In an embodiment, NAS 140 receives the total quota permitted for an access resource from billing server 150, and maintains the available amount by deducting the amount of access resource used.

In step 215, NAS 140 determines whether to notify a user of the status. In general, when an available amount for an access resource is below a pre-specified threshold, NAS 140 may determine to notify the user of the status of the availability of the access resource. For example, if a user is permitted to transfer only 4 Megabytes of data, but has already transferred 3.9 Megabytes, NAS 140 may determine to notify the user of the remaining available amount (0.1 Megabytes) of data. Control passes to step 220 if a notification is to be sent, or else to step 299.

In step 220, NAS 140 creates a packet containing a notification of the status, with the packet being defined according to a format consistent with PPP such that the format does not require use/definition of higher layer protocols on top of PPP. An example packet format is described in detail in a section below. Due to the use of such a format, client system 110 may not need to be executing software supporting higher layer protocols to receive the notification.

While the embodiments are described below with reference to NAS 140 sending the notification, alternative embodiments may be implemented in which other servers send such notification, for example, after NAS 140 performs steps 210 and 215. In general, some of the steps of FIG. 2 may be implemented in one server (e.g., NAS 140) and other steps may be implemented in another server.

In step 225, NAS 140 sends the packet to client system 110. In step 230, NAS 140 receives a response, also embedded in a PPP packet. The manner in which the response may be processed is described below. An example packet format for the response is described in detail in a section below.

In step 250, NAS 140 examines the response for presence of payment information. Payment information may contain data such as user name, password, credit card number and additional quota required. Control passes to step 260 if such an information is present, or else control passes to step 270.

In step 260, NAS 140 forwards the payment information to billing server 150. In response, billing server 150 may allocate the requested additional quota (for example, after charging the payment to the provided credit card number). Control then passes to step 280.

In step 270, NAS 140 sends a request to billing server 150 to send the updated information on available quota for the access resource. The request of step 270 is sent to check for a possible scenario in which the user has used other channels (e.g., a telephone call to an agent of provider network 130) to purchase additional access quota.

In step 280, NAS 140 receives data from billing server 150 indicating the present quota available for the access resource (for the user). The received data reflects any additional quota of the access resource purchased (or otherwise permitted/available) for the user. The communication (of steps 260, 270 and 280) between NAS 140 and billing server 150 may be implemented using any pre-specified convention.

In step 290, NAS 140 permits access of network services according to the present quota of access resource available for the user. Thus, access to network service(s) may be permitted only if the necessary access resources are all available for the user. The method ends in step 299.

Client system 110 generally needs to operate cooperatively with NAS 140 to notify the user and to enable replenishment of the access resources. The manner in which a client system may operate to replenish the user account with more access resources is described below with additional examples.

4. Operation of Client System

Figure 3:
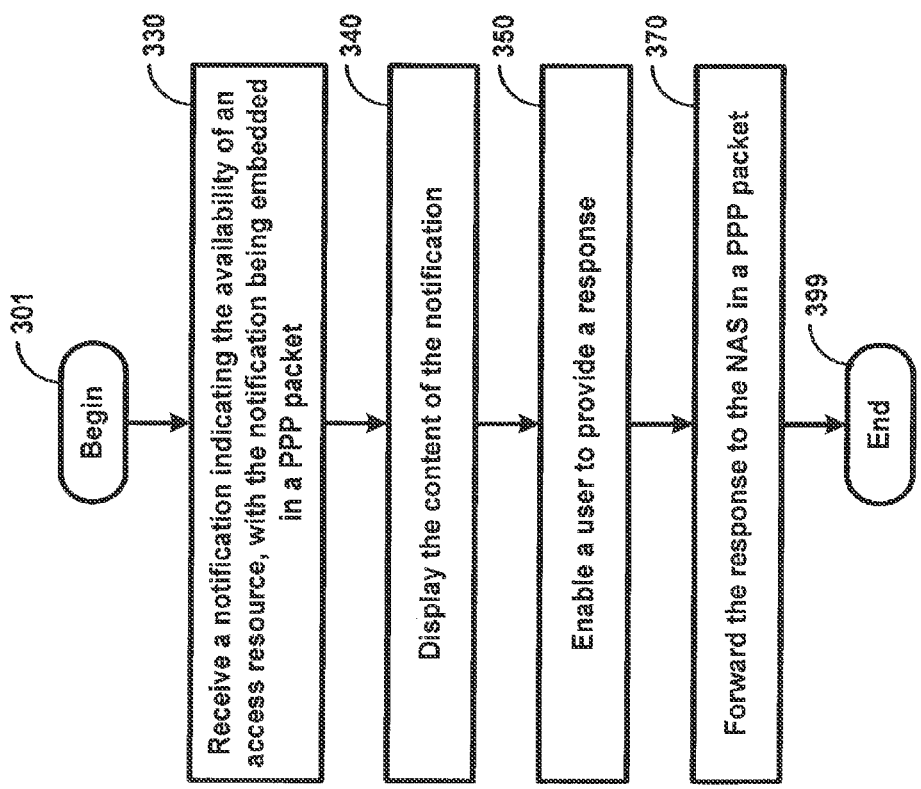
FIG. 3 is a flow chart illustrating the details of operation of a client system in an embodiment of the present invention.

FIG. 3 is a flow chart illustrating the manner in which a client system may replenish the account to receive more data packets. The flowchart is described with reference to FIG. 1 for illustration. However, the flowchart can be implemented in other environments as well. The method begins in step 301, in which control immediately passes to step 330.

In step 330, client system 110 receives a notification indicating the availability of an access resource, with the notification being embedded in a PPP packet such that client system 110 need not implement higher level layers (such as TCP or HTTP) on top of PPP to receive the notification.

In step 340, client system 110 displays the content of the notification to a user. For example, if the notification contains information on the time remaining to access a network service, the corresponding time may be displayed with the appropriate labels for understandability of the user. Similarly, if the user is exceeding a pre-specified quota of number of bytes that can be received, the corresponding number may also be displayed using a suitable user interface.

In step 350, client system 110 enables the user to provide a response. The response may contain payment information for purchase of additional quota of access resources. For example, the information may contain user name, password, credit card number, access quota required etc. Alternatively, a user may purchase additional quota by working with an agent and having the agent manually enter into billing server 150 data representing the availability of the purchased resources. In such a case, the response entered by a user may merely indicate that additional resources have been purchased independently.

In step 370, client system 110 may forward to NAS 140 the response embedded in a PPP packet. As noted above, NAS 140 examines the response for the presence of payment information and interfaces with billing server 150 to determine whether (and/or how long) to permit access of various network services. The method ends in step 399.

Thus, using the above approach(es), a user may be notified of the status of availability of various access resources, and enable replenishment of the access resources by appropriate communication between NAS 140 and billing server 150. Example packet format(s) enabling such a communication is described below in further detail.

5. Packet Format

As described above with reference to step 220 of FIG. 2, network access server 140 sends a notification indicating the status of availability of an access resource, with the notification being embedded in a PPP packet. In an embodiment described below, the remaining amount of an access resource is converted into time remaining in seconds and sent in a PPP packet. The time remaining can be estimated based on various parameters such as the expected rate of use of the resource and/or actual use in the past duration.

The time remaining, thus computed, can be included in an LCP type packet defined according to PPP. PPP is described in further detail in RFC 1661 entitled, "The Point-to-Point Protocol (PPP)", available from www.ietf.org. As noted in RFC 1661, the Protocol Field is set to 0xC021 to indicate that the packet relates to LCP.

The code field (following the Protocol Field) may be set to 13 to indicate that the packet contains a time remaining field in the following data bits, as described in further detail in RFC 1570 entitled, "LCP Extensions" (available from www.ietf.org). As further described in RFC 1570, the 'Seconds-Remaining' field may be set to the time remaining (computed, for example, as described above).

One problem with the approach of above is that it may not be possible to differentiate the basis for computation of the time remaining. For example, client system 110 may not have sufficient information to determine whether the time remaining is based on the permitted aggregate byte count or total time permitted to access a network service. An alternative embodiment overcomes such a problem as described below.

In an alternative embodiment, the Protocol Field (bytes 1-2 of the PPP packet) is again set to 0xC021 to indicate LCP type. The value in the code field (byte 3) is set to the next unused value, as described in RFC 1700 entitled, "Assigned Numbers", Authors: Reynolds, J. and J. Postel, dated October 1994, and in a document entitled, "Protocol Numbers and Assignment Services", available from Internet Assigned Numbers Authority, 4676 Admiralty Way, Suite 330, Marina del Rey, Calif. 90292 (also available at http://www.iana.org/numbers.html).

The remaining fields may be designed according to any appropriate convention as desired by a designer. However, both NAS 140 and client system 110 generally need to be implemented consistent with the convention. In one implementation, byte 4 indicates whether the packet contains a request (value=0) or a response (value=1). The remaining bytes of the packet vary depending on whether a notification or a response is represented. However, the fields may be encoded according to type (1 byte), length (1 byte) and value format as described in further detail.

In case, the packet represents a notification (sent from NAS 140 to client system 110), the remaining fields may indicate each access resource that may need to be replenished. A type may be defined to indicate each type of access resource. For illustration, type 1 may relate to an access resource representing the additional number of bytes a user is permitted to receive/transmit, and the length field may contain a value of 10 (indicating 8 additional bytes). The next 4 bytes may indicate the number of bytes remaining, and the following 4 bytes may indicate the approximate amount of time in which the bytes are likely to be received/transmitted.

Similarly, type 2 may relate to an access resource representing the additional time a user is permitted to access a network service. A time remaining field (4 bytes) may specify the number of seconds the user is permitted to access the resource. An identifier field may contain a character string (e.g., URL) identifying the specific network service to which the access resource relates to. The identifier field may have a null value (or 0 length) in case the number of seconds represents general access to any network service.

The packet types noted above are merely representative. Other types of access resources can be managed according to various aspects of the present invention. Client system 110 receives the content of such packets, and provides a suitable interface to enable a user to enter a response. As noted above, the response may include payment information and/or confirmation of replenishment by other channels (e.g., by telephone interaction with an agent of provider network 130). The manner in which the response may be transmitted to NAS 140 is described below in further detail.

The response packet (value of 1 in byte 4) may also be similarly designed using the type, length, and value (TLV) format described above. Thus, one type of field may contain credit card related information, and another type of field may contain data which specifies whether the user has confirmed (e.g., by checking off an appropriate field) replenishment by other channels.

A response packet thus created may be forwarded to NAS 140. As noted above, NAS 140 forwards the response to billing server 150 if payment information is contained. Otherwise, NAS 140 may check whether billing server 150 indicates availability of more access resource, which would justify permitting continued access to the user. NAS 140 accordingly continues forwarding according to the information provided by billing server 150.

From the above, it may be appreciated that a packet format which does not require use/definition of higher layers (such as HTTP) on top of point-to-point protocol (PPP) can be used to send both notifications and responses. As a client system may need to support PPP any way while being connected to a NAS for access, the client system may receive the notifications without executing substantially more software (for supporting the higher layer protocols). Thus, the implementation of client systems may be simplified. The description is continued with reference to the details of example embodiments of NAS 140.

6. Network Access Server

Figure 4:
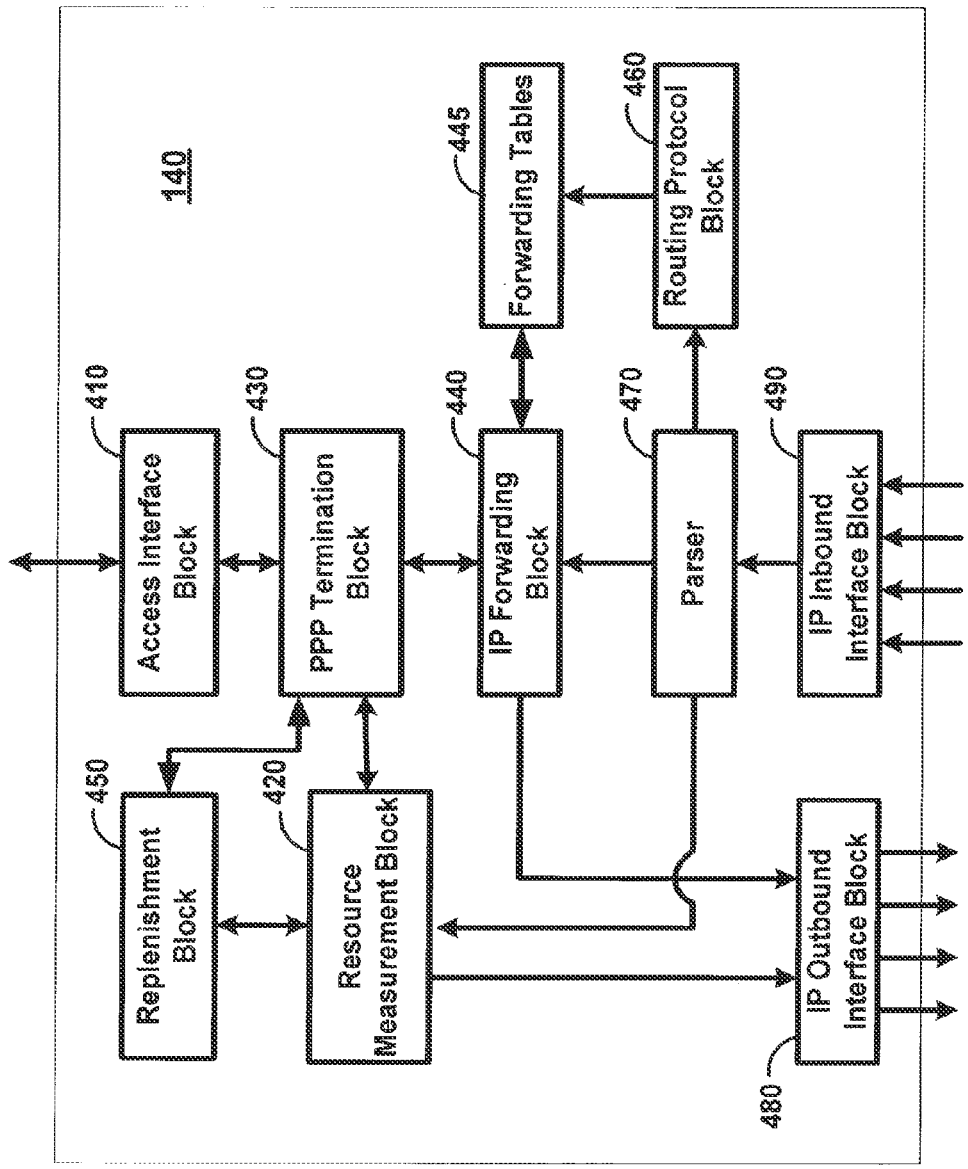
FIG. 4 is a block diagram illustrating the manner in which a network access server may be implemented in an embodiment of the present invention.

FIG. 4 is a block diagram illustrating the details of an embodiment of NAS 140 as relevant to several aspects of present invention. NAS 140 is shown containing access interface block 410, resource measurement block 420, PPP Termination block 430, IP forwarding block 440, replenishment block 450, routing protocol block 460, parser 470, IP outbound interface block 480 and IP inbound interface block 490. Each block is described below in further detail.

Access interface block 410 provides physical, electrical and protocol interface necessary to send/receive PPP packets to/from client system 110. IP outbound interface 480 and IP inbound interface 490 respectively enable IP packets to be sent and received using IP protocol. IP inbound interface 490 forwards the received packets to parser 470. Access interface block 410, IP outbound interface 480 and IP inbound interface 490 may be implemented in a known way.

Parser 470 examines the packets received from IP inbound interface 490, and forwards each packet to one of resource measurement block 420, IP forwarding block 440, and routing protocol block 460. Packets related to IP routing protocols are forwarded to routing protocol block, packets related to availability of access resources (from billing server 150) are forwarded to resource measurement block 420, and packets requiring additional forwarding are forwarded to IP forwarding block 440.

Routing protocol block 460 updates forwarding tables 445 based on routing requests received in various packets, and may be implemented using protocols such as RIP and OSPF in a known way. Forwarding tables 445 further contain data indicating the specific IP packets which are to be forwarded on the specific active tunnels.

IP forwarding block 440 receives packets from PPP termination block 430 and parser 470, and forwards each packet based on the data in forwarding tables 445. The packets to be tunneled on a PPP session are forwarded to PPP termination block 430, and IP packets merely requiring forwarding to the Intranet 170 (or other parts of Internet as well) are forwarded on one of the interfaces available on IP outbound interface 480.

PPP termination block 430 enables PPP sessions to be established (and terminated) to various client systems. Establishment of a PPP session generally entails authentication of a user, and authentication server (not shown) may be used for such purpose. Once authenticated, PPP termination block 430 sends data to resource measurement block 420 indicating the association of the user to the corresponding PPP session. Similarly, when a session is terminated, the corresponding information is also passed to resource measurement block 420.

PPP termination block 430 receives/sends (IP) packets on the established sessions. The IP packets received on each session are forwarded to IP forwarding block 440. Similarly, IP packets are received from IP forwarding block 440, and tunneled in PPP packets to client system 110 using access interface block 410. PPP termination block 430 further supports communication between replenishment block 450 and client system 110.

Resource measurement block 420 receives data indicating that a PPP session is established for a user. In response, the access resources permitted for the user may be determined based on the data available in billing server 150. Resource measurement block 420 then interfaces with PPP termination block 430 to measure various access resources (bytes transferred for the user, the amount of time a network service is accessed, etc.) used by each user in the corresponding session. If a user exceeds the permitted quota for an access resource, resource measurement block 420 may cause PPP termination block 430 to stop forwarding the packets related to the corresponding user/session(s).

Resource measurement block 420 determines whether to notify a user of the need to replenish a resource. The determination may be made, for example, when the remaining quota of an access resource falls below a specific threshold (which can differ for each user).

Resource measurement block 420 causes replenishment block 450 to interface with client system 110 if the user is to be notified, and receives a response generated by the user. The response may be forwarded to billing server 150 if the response contains payment information. Alternatively, resource measurement block 420 may merely check with billing server 150 whether the corresponding access resource(s) is replenished by other channels.

Resource measurement block 420 may periodically update billing server 150 indicating the amount of access resources consumed by each user with an active PPP session. While resource measurement block 420 is shown connected only to PPP termination block 430, it should be understood that resource measurement block 420 may be connected to other blocks as needed to measure corresponding access resources of interest.

Replenishment block 450 notifies a user of the need to replenish specific access resources, and receives the corresponding response. The request and response may be embedded in a PPP packet without requiring use/definition of higher level layers (such as HTTP) on top of PPP. Accordingly, replenishment block 450 is shown connected directly to PPP termination block 430. The response may be forwarded to resource measurement block 420. As described above, resource measurement block 420 uses the response to determine whether to continue to allow a user access of various network services.

Thus, an embodiment according to FIG. 4 can be used to provide access to various network services according to several aspects of the present invention. It should be understood that each feature of the present invention can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing the systems with a desired mix of hardware, software and/or firmware. An embodiment implemented substantially in software is described below.

7. Software Implementation

Figure 5:
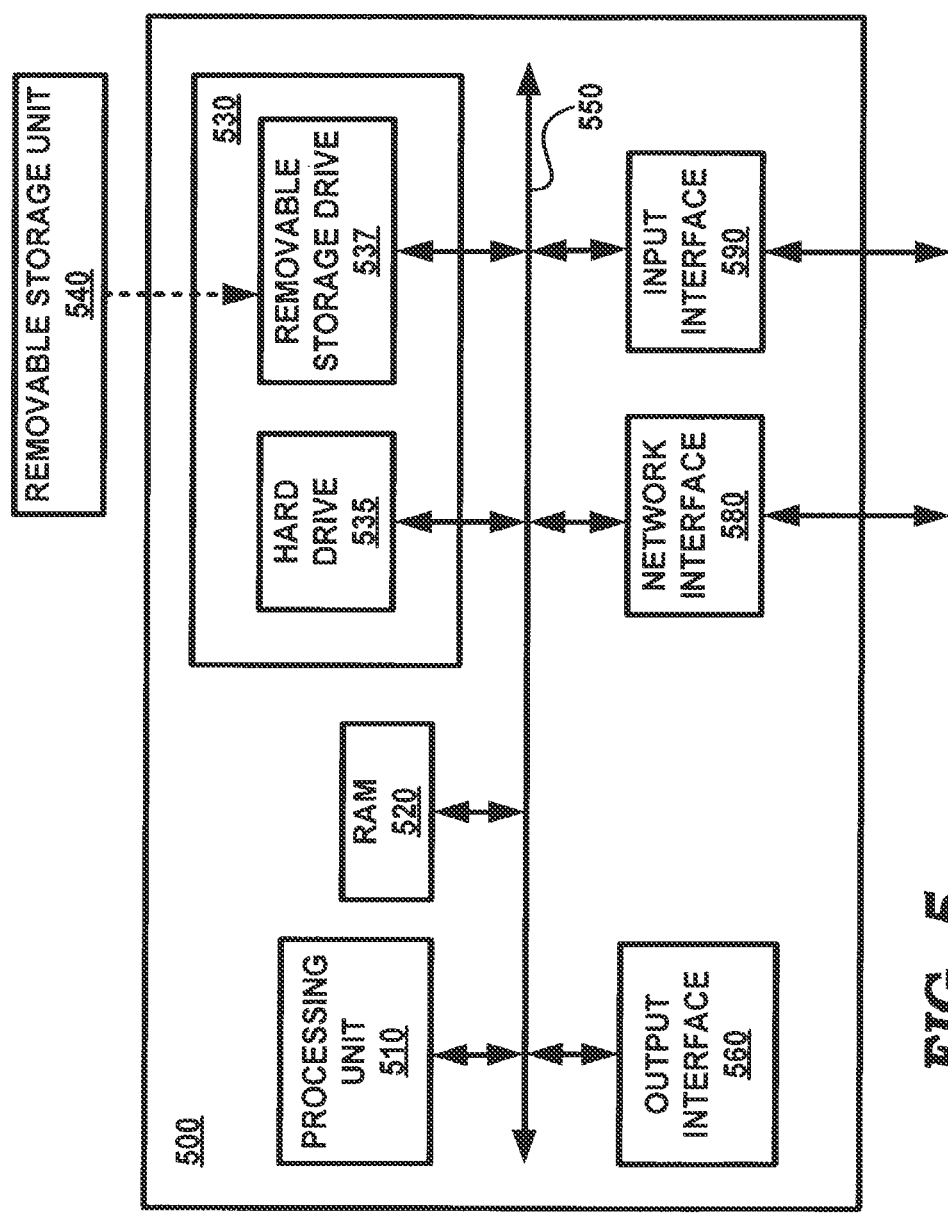
FIG. 5 is a block diagram illustrating the details of various systems implemented substantially in the form of software instructions according to an aspect of the present invention.

FIG. 5 is a block diagram illustrating the details of system 500, which may represent client system 110, NAS 140, or any server which sends a notification to client system 110. System 500 is shown containing processing unit 510, random access memory (RAM) 520, storage 530, output interface 560, network interface 580, and input interface 590. Each component is described below in further detail.

Output interface 560 provides output signals (e.g., display signals to a display unit, not shown) which can form the basis for a suitable user interface for a person (e.g, an administrator of network access server or an user in the case of a client system) to interact with system 500. Input interface 590 (e.g., interface with a key-board, dial-pad and/or mouse, not shown) enables a person to provide any necessary inputs to system 500. For example, a user in the case of a client system may provide payment/replenishment information using key-board interface as in step 350 of FIG. 3.

Network interface 580 enables system 500 to send and receive data packets according to corresponding protocols/physical interfaces. For example, a network interface card (NIC) may be used by client system and network access server. Network interface 580, output interface 560 and input interface 590 can be implemented in a known way.

RAM 520 and storage (secondary memory) 530 may together be referred to as a memory. While the memory units are shown provided within system 500, it should be understood that the memory can be provided from external units as well (using technologies such as network file sharing, storage area networks, etc.). RAM 520 receives instructions and data on path 550 from storage 530, and provides the instructions to processing unit 510 for execution. In addition, RAM 520 may be used to store one or more tables in forwarding table 445 present in FIG. 4.

Secondary memory 530 may contain units such as hard drive 535 and removable storage drive 537 storing data, which is readable by machines. Thus, secondary memory 530 may be viewed as containing machine readable medium. Secondary storage 530 may store the software instructions and data, which enable system 500 to provide several features in accordance with the present invention.

Some or all of the data and instructions may be provided on removable storage unit 540, and the data and instructions may be read and provided by removable storage drive 537 to processing unit 510. Floppy drive, magnetic tape drive, CD-ROM drive, DVD Drive, Flash memory, removable memory chip (PCMCIA Card, EPROM) are examples of such removable storage drive 537.

Processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520. In general, processing unit 510 reads sequences of instructions from various types of memory medium (including RAM 520, storage 530 anremovable storage unit 540), and executes the instructions to provide various features of the present invention as described above.

The embodiments of FIG. 5 are described as being implemented in the form of software instructions. The embodiments may use the packet formats and approaches described in sections above to implement several aspects of present invention.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method, comprising:
    receiving a notification associated with access resources available to a client system, wherein the notification is provided in a Link Control Protocol (LCP) packet formatted according to a point-to-point protocol (PPP) and wherein the notification comprises a first and a second byte identifying an LCP packet type, a third byte set to an unused value that identifies one or more remaining bytes of the notification, a fourth byte identifying an access resource type that needs to be replenished and four additional bytes identifying, at least in part, a remaining amount of the access resource type that needs to be replenished;
    providing a confirmation from a user of the client system in response to the notification, wherein the confirmation is embedded in one or more PPP packets; and
    receiving additional access resources based on the confirmation, wherein the client system does not use a web browser to replenish the additional access resources based on a format of the notification.

2. The method of claim 1, wherein the confirmation specifies that additional access resources have been purchased through an agent.

3. The method of claim 1, wherein the confirmation specifies only that additional access resources have been purchased and does not include payment information.

4. The method of claim 1, wherein the confirmation specifies whether a user has checked a field indicating that additional resources have been purchased through an agent.

5. The method of claim 1, further comprising:
    checking the confirmation from the user with a billing server to determine whether the billing server indicates availability of the additional access resources for which the confirmation was received.

6. The method of claim 1, wherein the four additional bytes further include an identifier field that includes a character string identifying a specific network service related to the access resource type that needs to be replenished.

7. The method of claim 6, wherein the character string includes a uniform resource locator (URL) identifying the specific network service.

8. A client system, comprising:
    a network interface;
    a memory for storing data; and
    a processor that executes instructions associated with the data, wherein the processor and the memory cooperate such that the client system is configured for:
    receiving a notification associated with access resources available to a client system, wherein the notification is provided in a Link Control Protocol (LCP) packet formatted according to a point-to-point protocol (PPP) and wherein the notification comprises a first and a second byte identifying an LCP packet type, a third byte set to an unused value that identifies one or more remaining bytes of the notification, a fourth byte identifying an access resource type that needs to be replenished and four additional bytes identifying, at least in part, a remaining amount of the access resource type that needs to be replenished;
    providing a confirmation from a user of the client system in response to the notification, wherein the confirmation is embedded in one or more PPP packets; and
    receiving additional access resources based on the confirmation, wherein the client system does not use a web browser to replenish the additional access resources based on a format of the notification.

9. The client system of claim 8, wherein the confirmation specifies that additional access resources have been purchased through an agent.

10. The client system of claim 8, wherein the confirmation specifies only that additional access resources have been purchased and does not include payment information.

11. The client system of claim 8, wherein the confirmation specifies whether a user has checked a field indicating that additional resources have been purchased through an agent.

12. The client system of claim 8, wherein the client system is further configured for:
    checking the confirmation from the user with a billing server to determine whether the billing server indicates availability of the additional access resources for which the confirmation was received.

13. The client system of claim 8, wherein the four additional bytes include an identifier field that includes a character string identifying a specific network service related to the access resource type that needs to be replenished.

14. The client system of claim 13, wherein the character string includes a uniform resource locator (URL) identifying the specific network service.

15. Software instructions encoded in non-transitory media for execution and when executed by a processor operable to perform operations, comprising:
    receiving a notification associated with access resources available to a client system, wherein the notification is provided in a Link Control Protocol (LCP) packet formatted according to a point-to-point protocol (PPP) and wherein the notification comprises a first and a second byte identifying an LCP packet type, a third byte set to an unused value that identifies one or more remaining bytes of the notification, a fourth byte identifying an access resource type that needs to be replenished and four additional bytes identifying, at least in part, a remaining amount of the access resource type that needs to be replenished;
    providing a confirmation from a user of the client system in response to the notification, wherein the confirmation is embedded in one or more PPP packets; and
    receiving additional access resources based on the confirmation, wherein the client system does not use a web browser to replenish the additional access resources based on a format of the notification.

16. The software instructions of claim 15, wherein the confirmation specifies that additional access resources have been purchased through an agent.

17. The software instructions of claim 15, wherein the confirmation specifies only that additional access resources have been purchased and does not include payment information.

18. The software instructions of claim 15, wherein the confirmation specifies whether a user has checked a field indicating that additional resources have been purchased through an agent.

19. The software instructions of claim 15, further comprising:
   checking the confirmation from the user with a billing server to determine whether the billing server indicates availability of the additional access resources for which the confirmation was received.

20. The software instructions of claim 15, wherein the four additional bytes further include an identifier field that includes a character string identifying a specific network service related to the access resource type that needs to be replenished and wherein the character string includes a uniform resource locator (URL) identifying the specific network service.

\* \* \* \* \*